United States Patent
Kim et al.

(10) Patent No.: US 11,003,909 B2
(45) Date of Patent: May 11, 2021

(54) NEURAL NETWORK TRAINED BY HOMOGRAPHIC AUGMENTATION

(71) Applicant: Raytheon Company, Waltham, MA (US)

(72) Inventors: Peter Kim, Irvine, CA (US); Michael J. Sand, Torrance, CA (US)

(73) Assignee: Raytheon Company, Waltham, MA (US)

( * ) Notice: Subject to any disclaimer, the term of this patent is extended or adjusted under 35 U.S.C. 154(b) by 132 days.

(21) Appl. No.: 16/359,279

(22) Filed: Mar. 20, 2019

(65) Prior Publication Data

US 2020/0302171 A1    Sep. 24, 2020

(51) Int. Cl.
| | |
|---|---|
| *G06K 9/00* | (2006.01) |
| *G06F 17/16* | (2006.01) |
| *G06N 3/04* | (2006.01) |
| *G06N 3/08* | (2006.01) |

(52) U.S. Cl.
CPC ......... *G06K 9/00664* (2013.01); *G06F 17/16* (2013.01); *G06N 3/0454* (2013.01); *G06N 3/08* (2013.01)

(58) Field of Classification Search
CPC .. G06F 17/16; G06K 9/00664; G06K 9/6271; G06K 9/6298; G06N 3/0454; G06N 3/08
See application file for complete search history.

(56) References Cited

U.S. PATENT DOCUMENTS

| | | | |
|---|---|---|---|
| 10,133,933 B1 | 11/2018 | Fisher et al. | |
| 2016/0174902 A1* | 6/2016 | Georgescu | G06T 7/0012 |
| | | | 600/408 |
| 2017/0083762 A1* | 3/2017 | Segalovitz | G06K 9/00463 |

(Continued)

FOREIGN PATENT DOCUMENTS

| | | |
|---|---|---|
| WO | WO-2016028813 A1 | 2/2016 |
| WO | WO-2020190951 A1 | 9/2020 |

OTHER PUBLICATIONS

"The Homography Transformation", CorrMap, [Online] Retrieved from the internet: <URL:http://www.corrmap.com/features/homography_transformation.php>, (accessed Feb. 28, 2019), 4 pgs.

(Continued)

*Primary Examiner* — Manuchehr Rahmjoo
(74) *Attorney, Agent, or Firm* — Schwegman Lundberg & Woessner, P.A.

(57) ABSTRACT

A machine trains a first neural network using a first set of images. Training the first neural network comprises computing a first set of weights for a first set of neurons. The machine, for each of one or more alpha values in order from smallest to largest, trains an additional neural network using an additional set of images. The additional set of images comprises a homographic transformation of the first set of images. The homographic transformation is computed based on the alpha value. Training the additional neural network comprises computing an additional set of weights for an additional set of neurons. The additional set of weights is initialized based on a previously computed set of weights. The machine generates a trained ensemble neural network comprising the first neural network and one or more additional neural networks corresponding to the one or more alpha values.

15 Claims, 8 Drawing Sheets

(56) References Cited

U.S. PATENT DOCUMENTS

| | | | | |
|---|---|---|---|---|
| 2018/0129893 A1* | 5/2018 | Son | ............... | G06N 3/0454 |
| 2018/0268250 A1* | 9/2018 | Drozdova | ............ | G06N 3/0454 |
| 2019/0005670 A1* | 1/2019 | DeTone | ............... | G06T 7/593 |
| 2019/0050640 A1* | 2/2019 | Sarkar | ............... | G06K 9/00449 |

OTHER PUBLICATIONS

Choe, Junsuk, et al., "Face Generation for Low-shot Learning using Generative Adversarial Networks", IEEE International Conference on Computer Vision Workshops, (2017), 9 pgs.

"International Application Serial No. PCT/US2020/023167, International Search Report dated Jul. 24, 2020", 5 pgs.

"International Application Serial No. PCT/US2020/023167, Written Opinion dated Jul. 24, 2020", 6 pgs.

Daniel, Detone, et al., "SuperPoint: Self-Supervised Interest Point Detection and Description", arxiv.org, Cornell University Library, 201 Olin Library Cornell University Ithaca, NY 14853, (Dec. 20, 2017), 13 pgs.

* cited by examiner

NEURAL NETWORK TRAINED BY HOMOGRAPHIC AUGMENTATION

TECHNICAL FIELD

Embodiments pertain to computer architecture. Some embodiments relate to neural networks. Some embodiments relate to neural networks trained by homographic augmentation.

BACKGROUND

Training an image recognition neural network may be difficult when there are few images of an object to be recognized or the images of the object are not taken from different angles and viewpoints. Techniques for training the image recognition neural network in these conditions may be desirable.

SUMMARY

Figure 1:
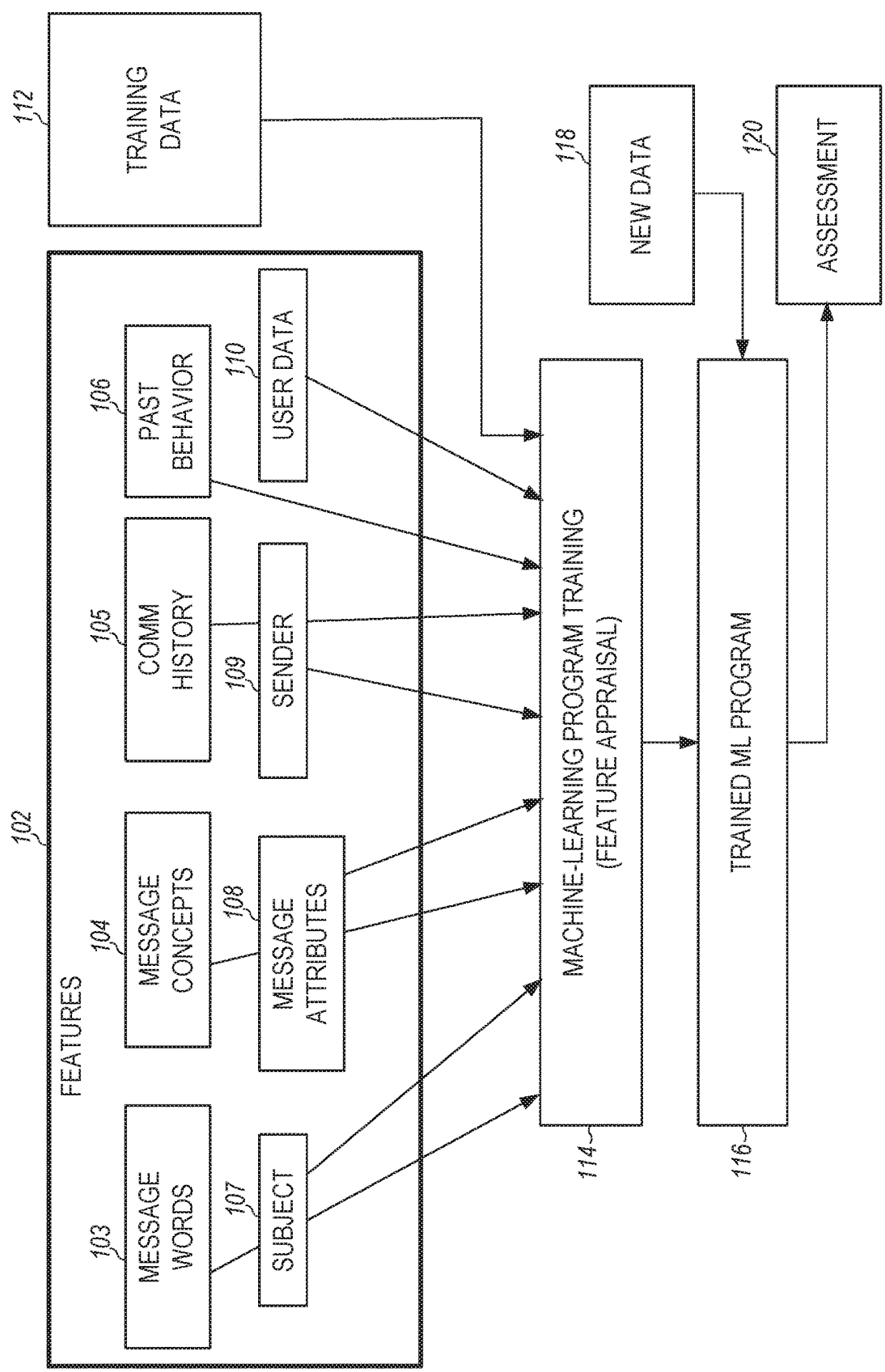
FIG. 1 illustrates the training and use of a machine-learning program, in accordance with some embodiments.

The present disclosure generally relates to machines configured to provide neural networks, including computerized variants of such special-purpose machines and improvements to such variants, and to the technologies by which such special-purpose machines become improved compared to other special-purpose machines that provide technology for neural networks. In particular, the present disclosure addresses neural networks trained by homographic augmentation.

According to some aspects of the technology described herein, a neural network apparatus include processing circuitry and memory. The processing circuitry trains a first neural network using a first set of images. Training the first neural network comprises computing a first set of weights for a first set of neurons. The processing circuitry, for each of one or more alpha values in order from smallest to largest, trains an additional neural network using an additional set of images. The additional set of images comprises a homographic transformation of the first set of images. The homographic transformation is computed based on the alpha value. Training the additional neural network comprises computing an additional set of weights for an additional set of neurons. The additional set of weights is initialized based on a previously computed set of weights. The processing circuitry generates a trained ensemble neural network comprising the first neural network and one or more additional neural networks corresponding to the one or more alpha values. The processing circuitry provides an output representing the trained ensemble neural network.

According to some aspects of the technology described herein, a neural network apparatus include processing circuitry and memory. The processing circuitry recognizes, using an ensemble neural network, an object in visual data. The ensemble neural network comprises a first neural network and one or more additional neural networks corresponding to one or more alpha values. The processing circuitry provides an output representing the recognized object in the visual data. The first neural network is trained using a first set of images by computing a first set of weights for a first set of neurons. Each of the one or more additional neural networks corresponding to the one or more alpha values is trained using an additional set of images. The additional set of images comprises a homographic transformation of the first set of images. The homographic transformation is computed based on the alpha value. The additional neural network is trained by computing an additional set of weights for an additional set of neurons. The additional set of weights is initialized based on a previously computed set of weights.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, training an image recognition neural network may be difficult when there are few images of an object to be recognized or the images of the object are not taken from different angles and viewpoints. Techniques for training the image recognition neural network in these conditions may be desirable. In some cases, image augmentation is used to create additional training images (e.g., images from different viewpoints or angles) from a single training set of images. However, in some cases, a deep neural network might not converge to a solution when too much data augmentations are applied during training.

Some aspects of the technology disclosed herein train a deep neural network to converge consistently to a solution by varying the data augmentation in stages. For example, when training a neural network with data augmentation produces a poor result, some aspects produce a better result by first training the neural network without data augmentation until it stabilizes to some solution, then continue training with data augmentation applied until the neural network stabilizes to a better solution. This technique may, in some cases, produce useful trained neural network(s) with high consistency.

Some aspects of the technology disclosed herein include changing the data augmentation during training (in place of or in addition to changing hyper-parameters). Some aspects include increasing the degree of data augmentation during training (rather than or in addition to modifying hyper-parameter values).

Some aspects include an application that applies random homography during the training time of a deep neural network for automatic object recognition (DNN-AOR). Some aspects apply homography at increasing rates while training a DNN-AOR. In some cases, it may be difficult to train a deep neural network without sufficient data (i.e. training data for an object is only available at certain azimuth and elevation angles). Applying a large amount of data augmentation may, in some cases, confuse a DNN-AOR and result in poor performance.

Some aspects allow for the transfer of learned weights from a previously trained DNN-AOR. Some aspects allow for the increase of data augmentation rates in stages. Some aspects allow for specification of how much to augment the image, and application of this augmentation at runtime. Some aspects are directed to a DNN-AOR training system that: allows for the transfer of weights from a previously-trained DNN-AOR, allows for the control of homography rates, and improves DNN-AOR performance where the training data is sparse in the viewing geometry. In one example, a DNN-AOR is used by an autonomous vehicle to recognize a pedestrian. In some examples, a DNN-AOR is used to identify a specified object, such as an airplane or a tank.

In some aspects, a computing machine trains a first neural network using a first set of images. Training the first neural network includes computing a first set of weights for a first set of neurons. The computing machine, for each of one or more alpha values in order from smallest to largest, trains an additional neural network using an additional set of images. The additional set of images are a homographic transformation of the first set of images. The homographic transformation is computed based on the alpha value. Training the additional neural network includes computing an additional set of weights for an additional set of neurons. The additional set of weights is initialized based on a previously computed set of weights (e.g. the set of weights computed for the immediately preceding alpha value or, for the first alpha value, the set of weights for the first neural network). The computing machine generates a trained ensemble neural network including the first neural network and one or more additional neural networks corresponding to the one or more alpha values. The computing machine provides an output representing the trained ensemble neural network. In some cases, the trained ensemble neural network is used (e.g. at the computing machine or at another computing device) to recognize an object in visual data (e.g. a new image that was not in the first set of images or in the additional set(s) of images).

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs having reached a performance plateau the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
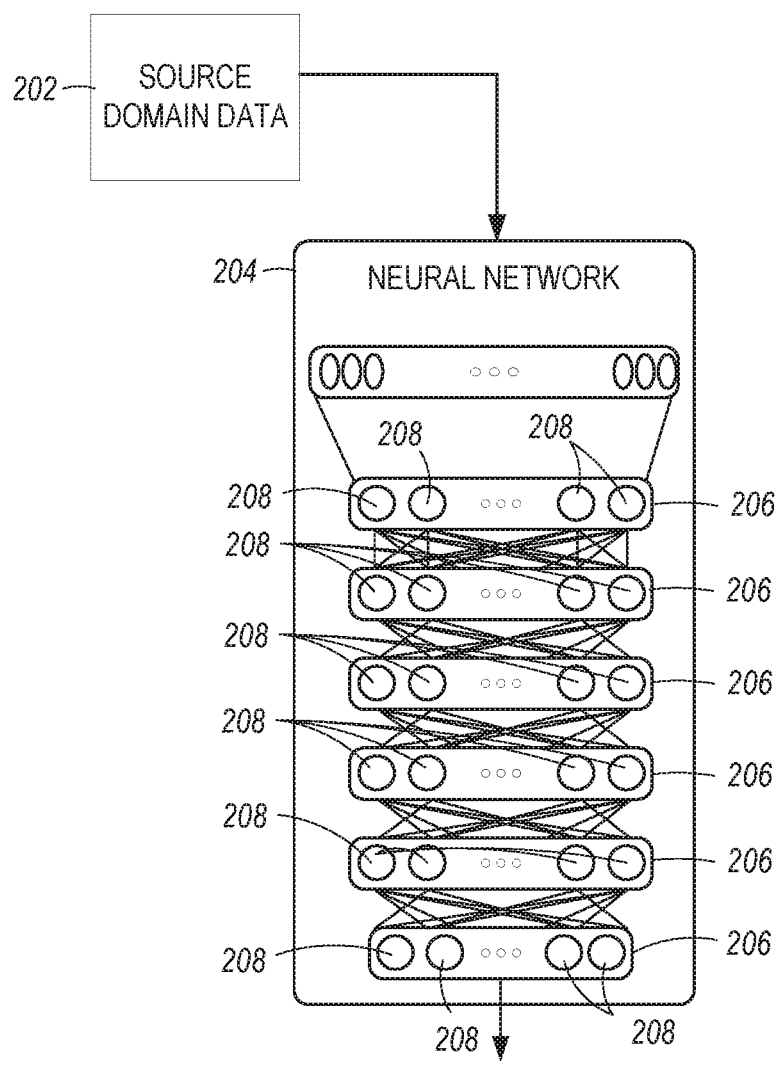
FIG. 2 illustrates an example neural network, in accordance with some embodiments.
Figure 2:
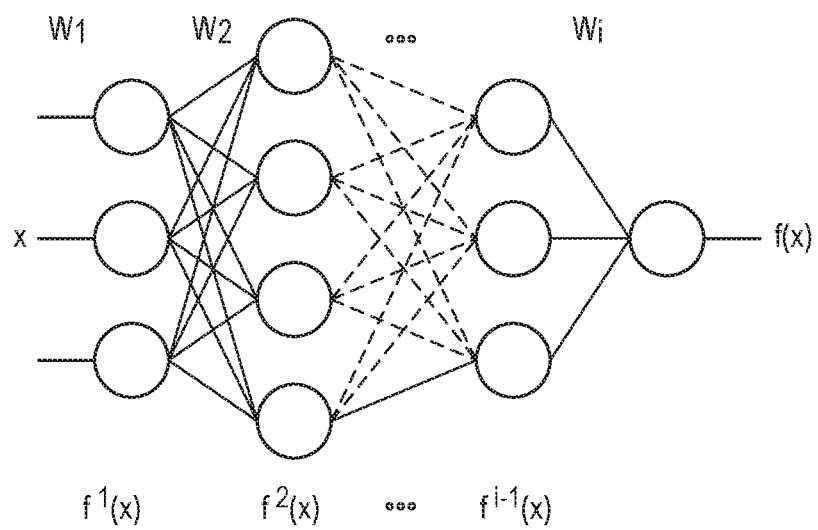

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1$, $W_2$, . . . , $W_i$ are applied to the input to each layer to arrive at $f^1(x)$, $f^2(x)$, . . . , $f^{i-1}(x)$, until finally the output f(x) is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM node serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
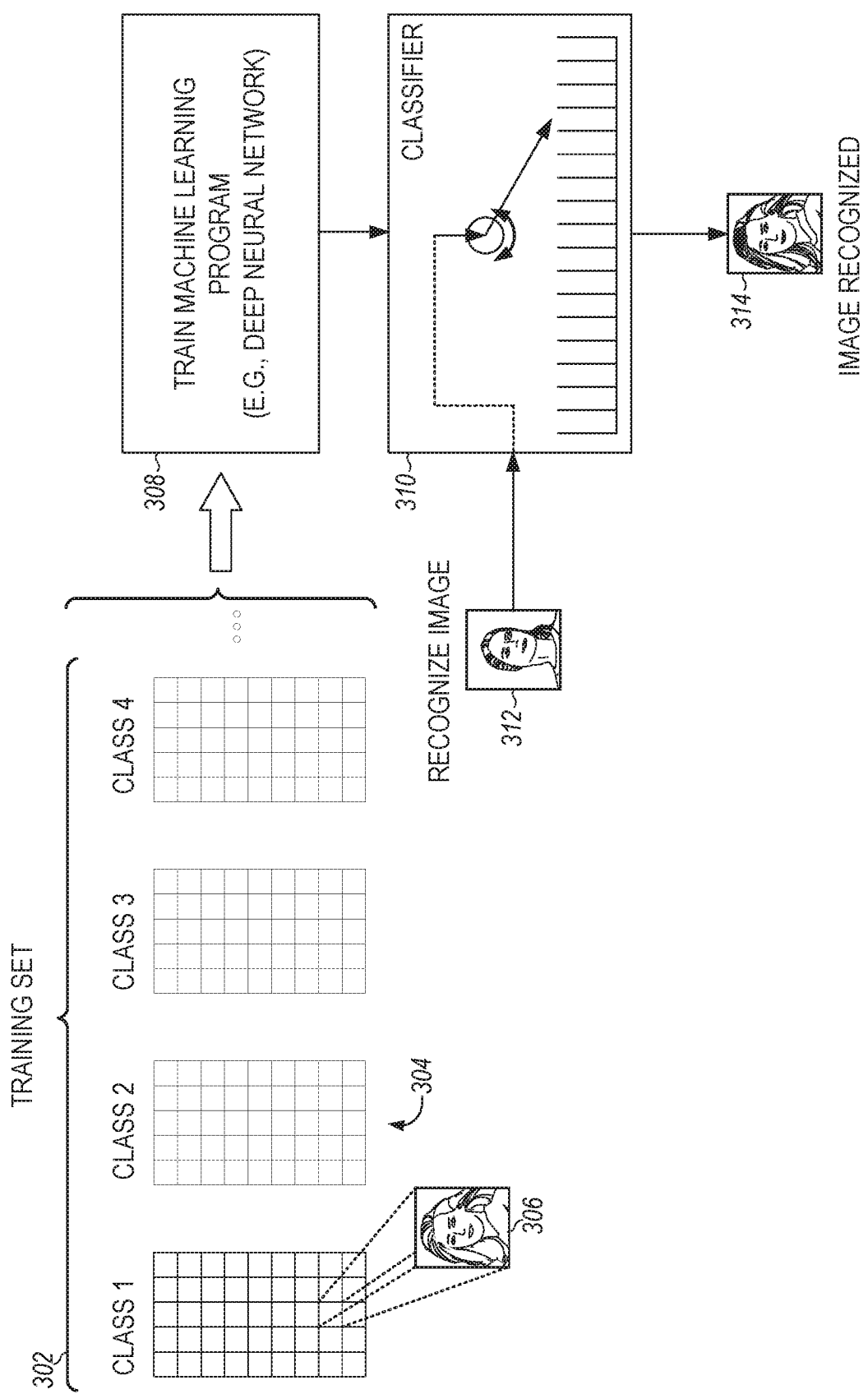
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
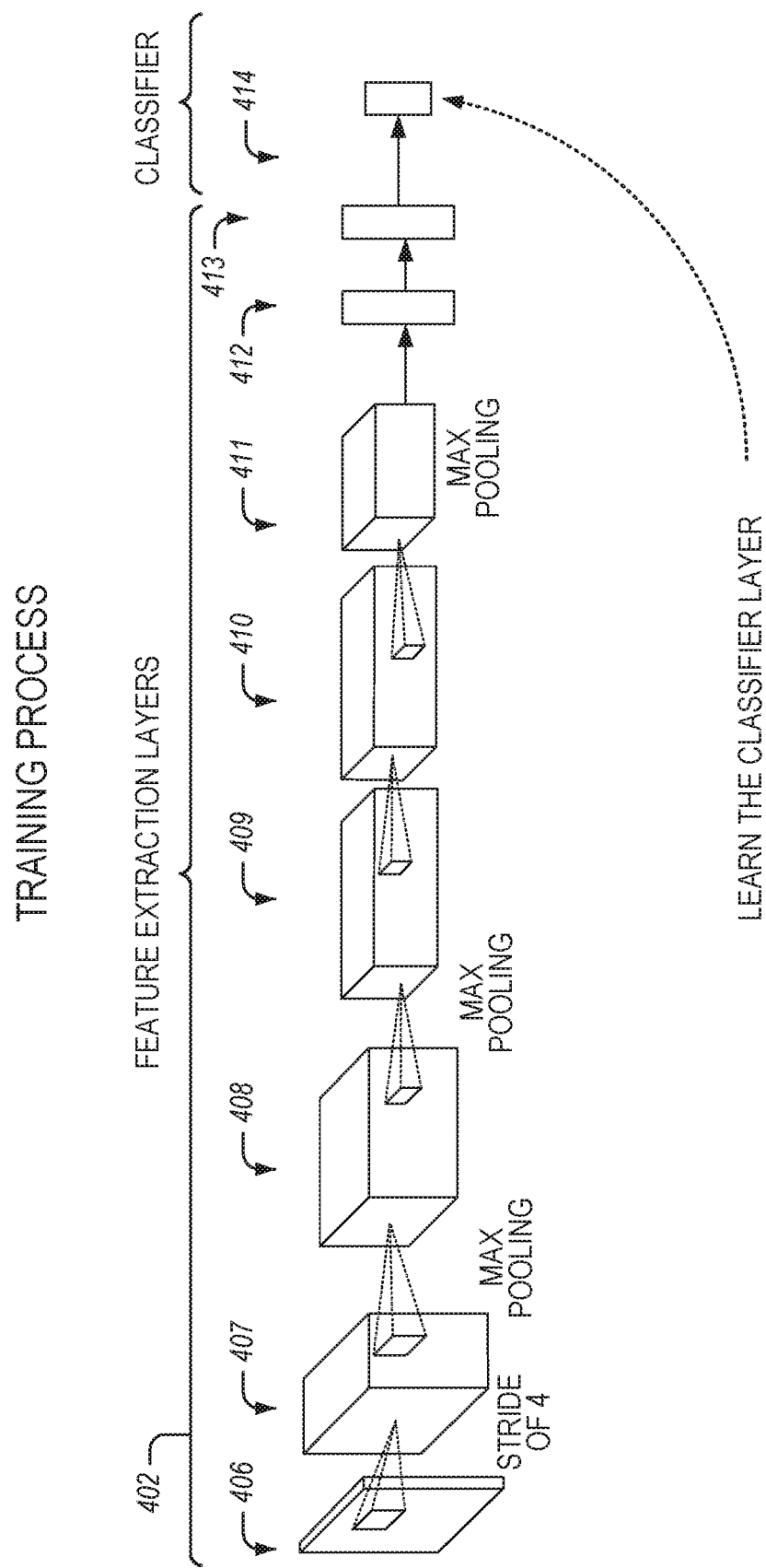
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
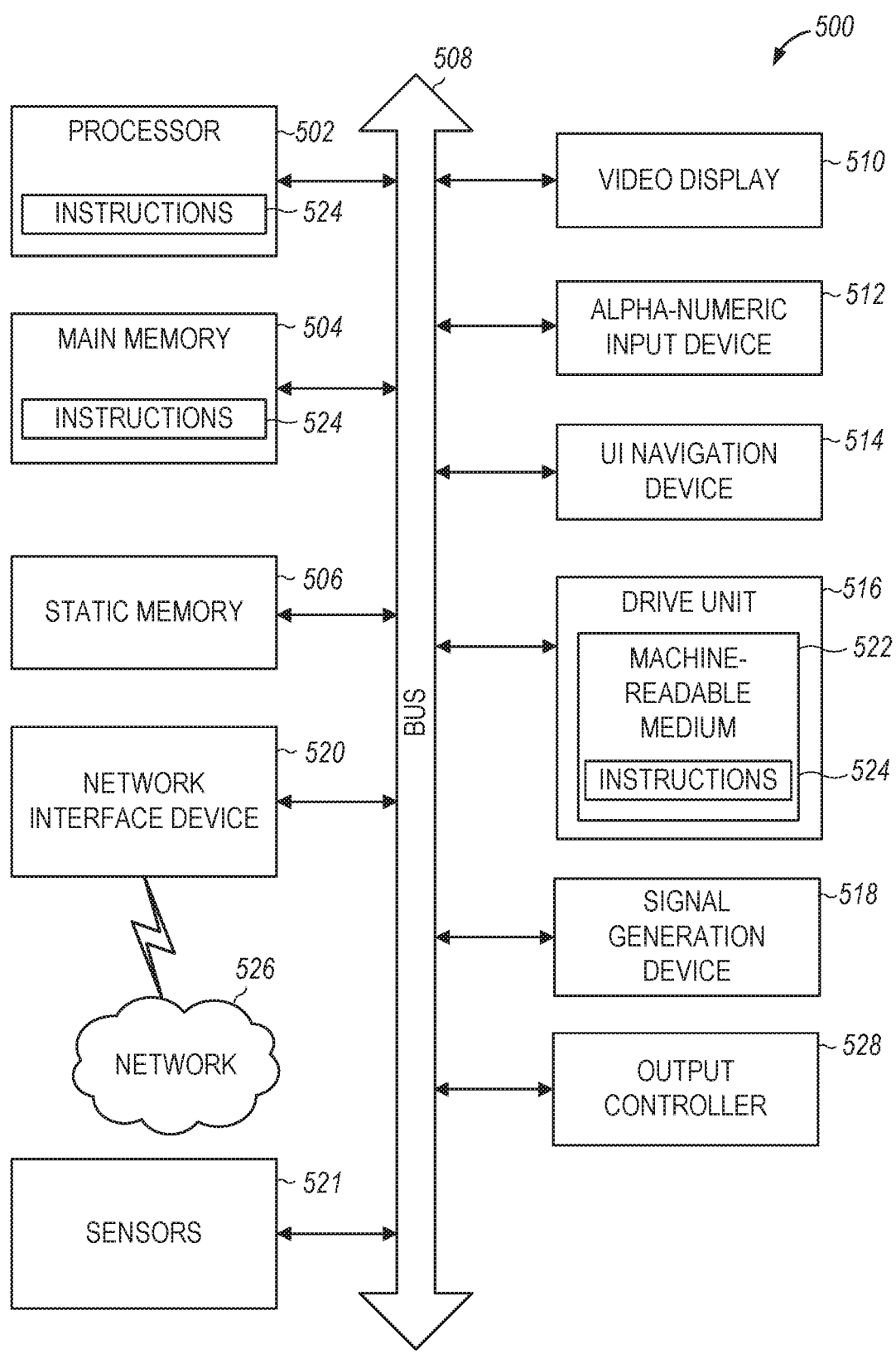
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Figure 6:
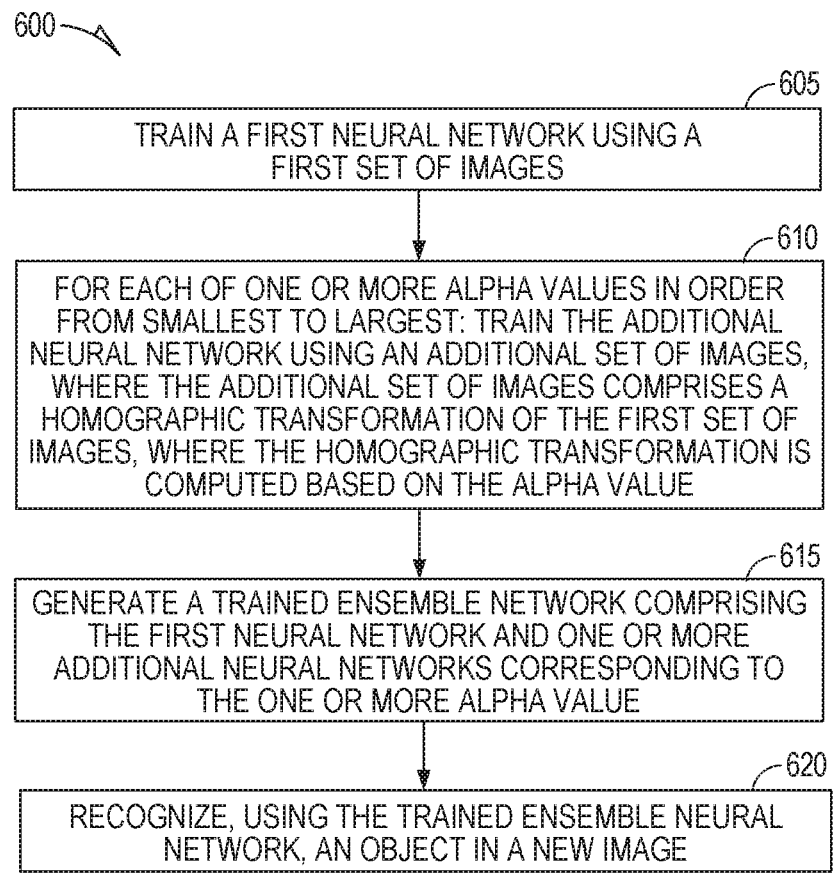
FIG. 6 is a flow chart illustrating an example method for training an ensemble neural network, in accordance with some embodiments.

FIG. 6 is a flow chart illustrating an example method 600 for training an ensemble neural network, in accordance with some embodiments.

At operation 610, a computing machine (e.g. the computing machine 500) trains a first neural network using a first set of images. Training the first neural network includes computing a first set of weights for a first set of neurons.

At operation 620, the computing machine 500, for each of one or more alpha values in order from smallest to largest, trains an additional neural network using an additional set of images. The additional set of images comprises a homographic transformation of the first set of images. The homographic transformation is computed based on the alpha value. Training the additional neural network comprises computing an additional set of weights for an additional set of neurons. The additional set of weights is initialized based on a previously computed set of weights (e.g. the set of weights computed for the immediately preceding alpha value or, for the first alpha value, the set of weights for the first neural network).

The one or more alpha values are a measure of the scale of the homography. Each of the one or more alpha variables is between 0 and 1. The one or more alpha values may be received as input from a user or obtained using any other technique. The alpha value(s) are processed in order from the smallest alpha value to the largest alpha value. For example, if the alpha value(s) include 0.2, 0.3, 0.16, 0.22, and 0.1, then 0.1 is processed first, followed by 0.16, followed by 0.2, followed by 0.22, followed by 0.3.

In some cases, the first set of images includes two-dimensional (2D) images having an x-axis and a y-axis. In some cases, the homographic transformation of the first set of images is computed according to:

$$\vec{x}_{new} = \vec{x}_{old} + \text{shift}(\vec{x}_{old}, \alpha) \qquad \text{Equation 1}$$

$$\vec{y}_{new} = \vec{y}_{old} + \text{shift}(\vec{y}_{old}, \alpha) \qquad \text{Equation 2}$$

In Equations 1-2: $\vec{x}_{old}$ and $\vec{y}_{old}$ are x and y coordinates of each corner of an image from the first set of images; $\vec{x}_{new}$ and $\vec{y}_{new}$ are corresponding x and y coordinates of each corner of the homographic transformation of the image; $\alpha$ represents the alpha value; and shift represents a shifting function. Example shifting functions are provided in Equations 3-4.

$$\text{shift}(\vec{x}_{old}, \alpha) = \alpha * \vec{z}_x * (\max(\vec{x}_{old}) - \min(\vec{x}_{old})) \qquad \text{Equation 3}$$

$$\text{shift}(\vec{y}_{old}, \alpha) = \alpha * \vec{z}_y * (\max(\vec{y}_{old}) - \min(\vec{y}_{old})) \qquad \text{Equation 4}$$

In Equations 3-4, $\vec{z}_x$ and $\vec{z}_y$ are samples (e.g. random samples) from a distribution between −1 and 1. The distribution may be a uniform distribution, a normal distribution, or any other probability distribution. In some cases, each of the first neural network and the one or more additional neural networks corresponding to the one or more alpha values comprises: an input layer, one or more hidden layers, and an output layer. Each of the input layer, the one or more hidden layers, and the output layer comprises neurons.

In Equations 1-4, the homography transformation parameters are the source ($\vec{x}_{old}$, $\vec{y}_{old}$) and destination points ($\vec{x}_{new}$, $\vec{y}_{new}$). Random homography can be applied by randomly choosing the destination points. The rate of random homography may be controlled via a scale variable $\alpha$ ranging from 0 to 1.

At operation 630, the computing machine 500 generates a trained ensemble neural network comprising the first neural network and one or more additional neural networks corresponding to the one or more alpha values. In some cases, the computing machine 500 provides an output representing the trained ensemble neural network.

The trained ensemble neural network may be retained at the computing machine 500 for usage thereat, such as stored in main memory 504, static memory 506, and/or drive unit 516. Alternatively, the trained ensemble neural network may be provided to a computing device different from the computing machine 500 for usage thereafter, such as by transferring the trained ensemble neural network to the computing device via network 526.

At operation 640, the computing machine 500 or the computing device recognizes, using the trained ensemble neural network, an object in visual data (e.g. a new image that was not in the first set of images or in the additional set(s) of images). The computing machine 500 or the computing device provides an output representing the recognized object in the visual data, such as to video display 510.

As discussed above, the alpha value for the x-axis and the y-axis is the same. However, in alternative embodiments, different alpha values can be used for the x-axis and the y-axis. Also, the example above discusses 2D images. However, the technology may be expanded to three-dimensional (3D) images or to images having more than three dimensions (>3D). In the 3D and >3D images, either the same alpha value may be used for all of the dimensions, or each of the dimensions may have its own alpha value that is different from the other dimensions' alpha values.

Figure 7:
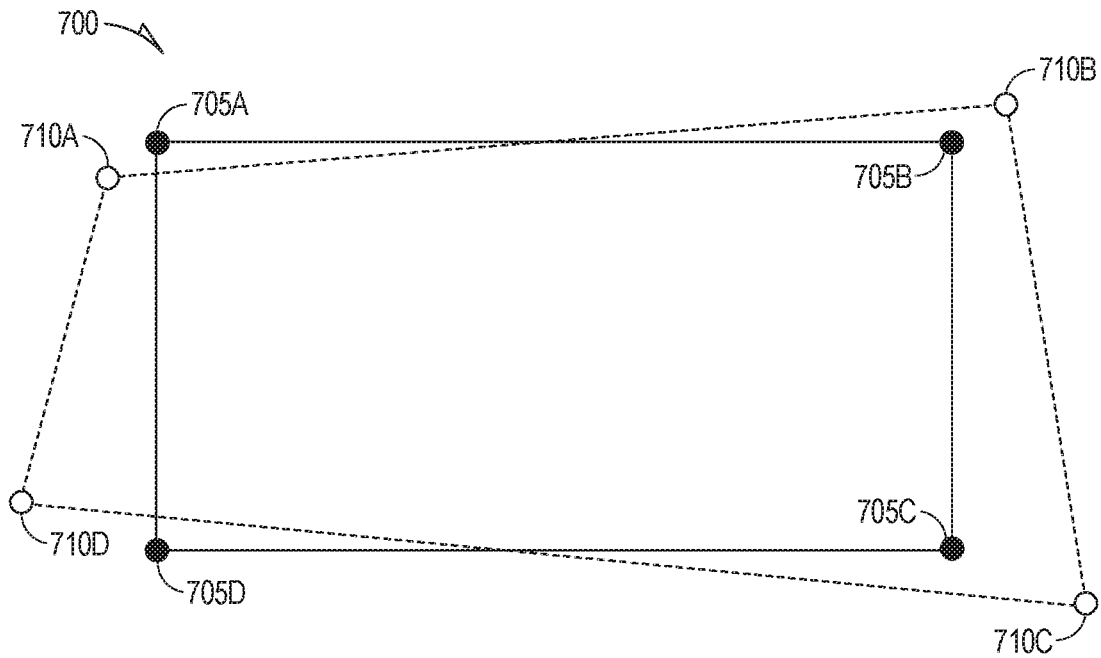
FIG. 7 illustrates a first example of homographic augmentation, in accordance with some embodiments.

FIG. 7 illustrates a first example of homographic augmentation 700, in accordance with some embodiments. As shown in FIG. 7, a rectangle defined by the points 705A, 705B, 705C, and 705D is augmented into a quadrangle defined by the points 710A, 710B, 710C, and 710D, based on Equations 1-4 above.

One example application of the technology described herein includes a rectangular image with four corner points: (0, 0), (30, 0), (0, 20), (30, 20). This rectangle may correspond to the rectangle 705A-705B-705C-705D illustrated in FIG. 7.

For these points: $\vec{x}_{old}$=(0, 30, 0, 30), $\vec{z}_x$=(-0.7, 0.8, -0.2, 0.3), $\alpha$=0.3, where the alpha value is selected by the user and $\vec{z}_x$ is randomly generated. In the example above, shift($\vec{x}_{old}$, $\alpha$)=0.3*(-0.7, 0.8, -0.2, 0.3)*(30-0)=(-6.3, 7.2, -1.8, 2.7). As a result: $\vec{x}_{new}$=(0, 30, 0, 30)+(-6.3, 7.2, -1.8, 2.7)=(-6.3, 37.2, -1.8, 32.7).

In the y direction, a similar computation occurs: $\vec{y}_{old}$=(0, 0, 20, 20), $\vec{z}_y$=(0.5, -0.4, 0.1, 0.9), $\alpha$=0.3, where the alpha value is selected by the user and $\vec{z}_y$ is randomly generated. In the example above, shift($\vec{x}_{old}$, $\alpha$)=0.3*(0.5, -0.4, 0.1, 0.9)*(20-0)=(3, -2.4, 0.6, 5.4). As a result, $\vec{y}_{new}$=(0, 0, 20, 20)+(3, -2.4, 0.6, 5.4)=(3, -2.4, 20.6, 25.4).

From the above calculations, the four corner points of the augmented quadrangle are: (-6.3, 3), (37.2, -2.4), (-1.8, 20.6), (32.7, 25.4). This quadrangle may correspond to the quadrangle 710A-710B-710C-710D illustrated in FIG. 7.

Figure 8A:
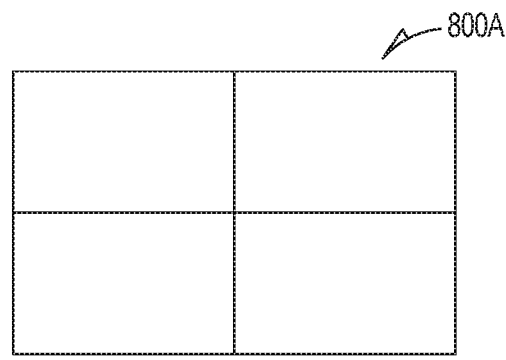
FIGS. 8A-8C illustrate additional examples of homographic augmentation, in accordance with some embodiments.
Figure 8B:
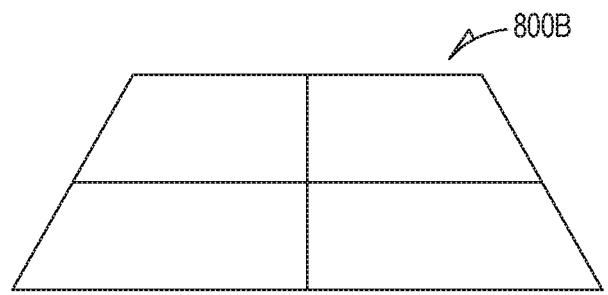
Figure 8C:
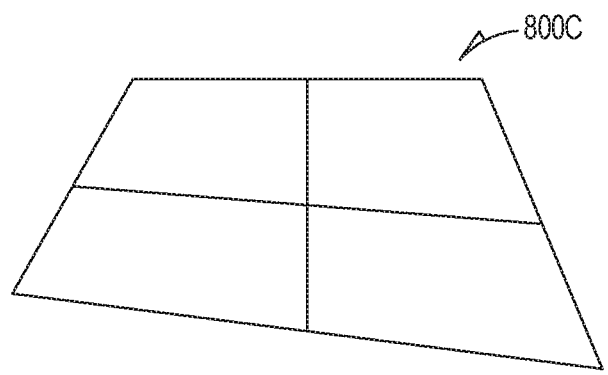

FIGS. 8A-8C illustrate additional examples of homographic augmentation, in accordance with some embodiments. FIG. 8A illustrates a first rectangle 800A divided into four quadrants. In FIG. 8B, the rectangle 800A is augmented into the quadrangle 800B. In FIG. 8C, the rectangle 800A is augmented into the quadrangle 800C. The quadrangle 800C may correspond to a larger alpha value than the quadrangle 800B, as there is more augmentation in the quadrangle 800C (relative to the rectangle 800A) in the quadrangle 800B (relative to the rectangle 800A).

Figure 9:
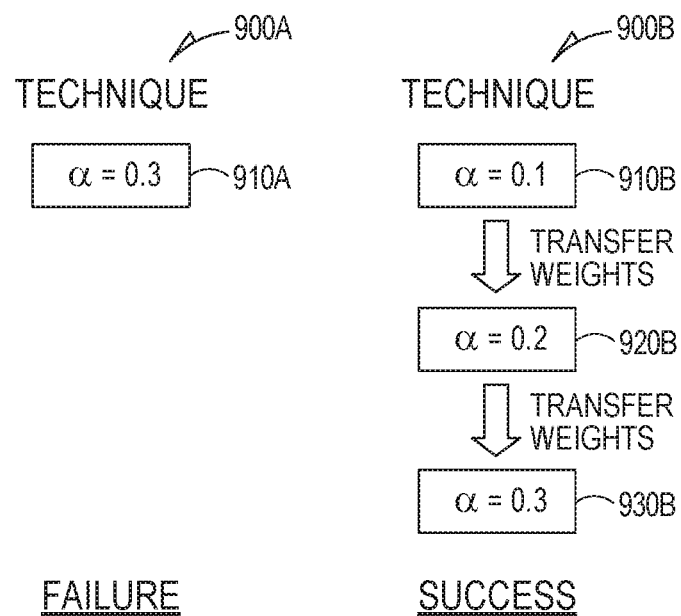
FIG. 9 illustrates two techniques for training neural networks, in accordance with some embodiments.

FIG. 9 illustrates two techniques 900A and 900B for training neural networks, in accordance with some embodiments.

As shown, in the technique 900A, at operation 910A, the alpha value is set to 0.3. This results (in some cases) in failure of the neural network to converge during training. In some examples, the alpha values do not change the variability of the weights but rather adds variability to the training data. The lack of convergence is caused by the training data being too wildly varying. (A useful analogy may be a child learning calculus. If the child has not first learned the basic prerequisites, (algebra, trigonometry, and the like) then the likelihood of him/her successfully learning calculus is low.) Similarly, in the instant case, when the training data is distorted too wildly at the onset of training, the neural network has a difficult time converging to a solution.

In the technique 900B, at operation 910B, the alpha value is set to 0.1. After the neural network converges, at operation 920B, the weights from the $\alpha$=0.1 neural network are transferred to a neural network with $\alpha$=0.2. That neural network is trained by adjusting the weights. After the neural network with $\alpha$=0.2 converges, at operation 930B, the weights from the $\alpha$=0.1 neural network are transferred to a neural network with $\alpha$=0.3. The neural network with $\alpha$=0.3 now converges during its training, resulting in a success.

As shown in FIG. 9, a DNN may fail to produce good results when a large homography warping is applied from the start of training. In some aspects, the technique 900B allows gradual increase in homography via transferring previously learned weights with lower rates of homography warping (lower alpha values).

In some cases, large homographic transforms are needed to augment data to better represent viewing angles much farther from those spanned by the training data. Applying large homomorphic transforms early in the training process can negatively impact convergence of the DNN training. Some aspects of the technology disclosed herein allow achievement of those large homomorphic transforms without impacting DNN training convergence.

Some aspects of the technology disclosed herein include a technique of controlling the random warping rate. Some aspects include applying increased warping with transfer learning.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A neural network apparatus, the apparatus comprising: processing circuitry and memory; the processing circuitry to:
train a first neural network using a first set of images, wherein training the first neural network comprises computing a first set of weights for a first set of neurons;
for each of one or more alpha values in order from smallest to largest: train an additional neural network using an additional set of images, wherein the additional set of images comprises a homographic transformation of the first set of images, wherein the homographic transformation is computed based on the alpha value, wherein training the additional neural network comprises computing an additional set of weights for an additional set of neurons, wherein the additional set of weights is initialized based on a previously computed set of weights;
generate a trained ensemble neural network comprising the first neural network and one or more additional neural networks corresponding to the one or more alpha values; and
provide an output representing the trained ensemble neural network, wherein the first set of images comprises images with at least two dimensions having an x-axis and a y-axis, wherein the homographic transformation of the first set of images is computed according to:

$$\vec{x}_{new} = \vec{x}_{old} + \text{shift}(\vec{x}_{old}, \alpha),$$

and $$\vec{y}_{new} = \vec{y}_{old} + \text{shift}(\vec{y}_{old}, \alpha),$$

wherein:
$\vec{x}_{old}$ and $\vec{y}_{old}$ are x and y coordinates of each corner of an image from the first set of images;
$\vec{x}_{new}$ and $\vec{y}_{new}$ are corresponding x and y coordinates of each corner of the homographic transformation of the image;
$\alpha$ represents the alpha value; and
shift represents a shifting function.

2. The apparatus of claim 1, wherein the processing circuitry is further to:
recognize, using the trained ensemble neural network, an object in a new image.

3. The apparatus of claim 1, wherein the first set of images comprises images with exactly two dimensions.

4. The apparatus of claim 1, wherein the shifting function is:

$$\text{shift}(\vec{x}_{old}, \alpha) = \alpha * \vec{z}_x * (\max(\vec{x}_{old}) - \min(\vec{x}_{old})),$$

and $$\text{shift}(\vec{y}_{old}, \alpha) = \alpha * \vec{z}_y * (\max(\vec{y}_{old}) - \min(\vec{y}_{old}))$$

wherein:
$\vec{z}_x$ and $\vec{z}_y$ are samples from a distribution between −1 and 1.

5. The apparatus of claim 1, wherein each of the first neural network and the one or more additional neural networks corresponding to the one or more alpha values comprises: an input layer, one or more hidden layers, and an output layer, and wherein each of the input layer, the one or more hidden layers, and the output layer comprises neurons.

6. A non-transitory machine-readable medium storing instructions which, when executed by processing circuitry of one or more machines, cause the processing circuitry to:
train a first neural network using a first set of images, wherein training the first neural network comprises computing a first set of weights for a first set of neurons;
for each of one or more alpha values in order from smallest to largest: train an additional neural network using an additional set of images; wherein the additional set of images comprises a homographic transformation of the first set of images, wherein the homographic transformation is computed based on the alpha value, wherein training the additional neural network comprises computing an additional set of weights for an additional set of neurons, wherein the additional set of weights is initialized based on a previously computed set of weights;
generate a trained ensemble neural network comprising the first neural network and one or more additional neural networks corresponding to the one or more alpha values; and
provide an output representing the trained ensemble neural network, wherein the first set of images comprises images with at least two dimensions having an x-axis and a y-axis, wherein the homographic transformation of the first set of images is computed according to:

$$\vec{x}_{new} = \vec{x}_{old} + \text{shift}(\vec{x}_{old}, \alpha)$$

and $$\vec{y}_{new} = \vec{y}_{old} + \text{shift}(\vec{y}_{old}, \alpha)$$

wherein:

$\vec{x}_{old}$ and $\vec{y}_{old}$ are x and y coordinates of each corner of an image from the first set of images;

$\vec{x}_{new}$ and $\vec{y}_{new}$ are corresponding x and y coordinates of each corner of the homographic transformation of the image;

$\propto$ represents the alpha value; and shift represents a shifting function.

7. The machine-readable medium of claim 6, wherein the processing circuitry is further to:

recognize, using the trained ensemble neural network, an object in a new image.

8. The machine-readable medium of claim 6, wherein the first set of images comprises images with exactly two dimensions.

9. The machine-readable medium of claim 6, wherein the shifting function is:

$$\text{shift}(\vec{x}_{old},\propto)=\propto*\vec{z}_x*(\max(\vec{x}_{old})-\min(\vec{x}_{old})),$$

and $$\text{shift}(\vec{y}_{old},\propto)=\propto*\vec{z}_y*(\max(\vec{y}_{old})-\min(\vec{y}_{old})),$$

wherein:

$\vec{z}_x$ and $\vec{z}_y$ are samples from a distribution between −1 and 1.

10. The machine-readable medium of claim 6, wherein each of the first neural network and the one or more additional neural networks corresponding to the one or more alpha values comprises: an input layer, one or more hidden layers, and an output layer, and wherein each of the input layer, the one or more hidden layers, and the output layer comprises neurons.

11. A neural network method comprising:

training a first neural network using a first set of images, wherein training the first neural network comprises computing a first set of weights for a first set of neurons;

for each of one or more alpha values in order from smallest to largest: training an additional neural network using an additional set of images, wherein the additional set of images comprises a homographic transformation of the first set of images, wherein the homographic transformation is computed based on the alpha value, wherein training the additional neural network comprises computing an additional set of weights for an additional set of neurons, wherein the additional set of weights is initialized based on a previously computed set of weights;

generating a trained ensemble neural network comprising the first neural network and one or more additional neural networks corresponding to the one or more alpha values; and providing an output representing the trained ensemble neural network, wherein the first set of images comprises images with at least two dimensions having an x-axis and a y-axis, wherein the homographic transformation of the first set of images is computed according to:

$$\vec{x}_{new}=\vec{x}_{old}+\text{shift}(\vec{x}_{old},\propto),$$

and $$\vec{y}_{new}=\vec{y}_{old}+\text{shift}(\vec{y}_{old},\propto)$$

wherein:

$\vec{x}_{old}$ and $\vec{y}_{old}$ are x and y coordinates of each corner of an image from the first set of images;

$\vec{x}_{new}$ and $\vec{y}_{new}$ are corresponding x and y coordinates of each corner of the homographic transformation of the image;

$\propto$ represents the alpha value; and shift represents a shifting function.

12. The method of claim 11, further comprising:

recognizing, using the trained ensemble neural network, an object in a new image.

13. The method of claim 11, wherein the first set of images comprises images with exactly two dimensions.

14. The method of claim 11, wherein the shifting function is:

$$\text{shift}(\vec{x}_{old},\propto)=\propto*\vec{z}_x*(\max(\vec{x}_{old})-\min(\vec{x}_{old})),$$

and $$\text{shift}(\vec{y}_{old},\propto)=\propto*\vec{z}_y*(\max(\vec{y}_{old})-\min(\vec{y}_{old})),$$

wherein:

$\vec{z}_x$ and $\vec{z}_y$ are samples from a distribution between −1 and 1.

15. The method of claim 11, wherein each of the first neural network and the one or more additional neural networks corresponding to the one or more alpha values comprises: an input layer, one or more hidden layers, and an output layer, and wherein each of the input layer, the one or more hidden layers, and the output layer comprises neurons.

\* \* \* \* \*

UNITED STATES PATENT AND TRADEMARK OFFICE
CERTIFICATE OF CORRECTION

PATENT NO. : 11,003,909 B2
APPLICATION NO. : 16/359279
DATED : May 11, 2021
INVENTOR(S) : Kim et al.

Page 1 of 2

It is certified that error appears in the above-identified patent and that said Letters Patent is hereby corrected as shown below:

In the Specification

In Column 9, Line 12, after "data)", insert --to--

In Column 10, Line 63, after "(USB),", insert --parallel,--

In Column 11, Line 64, delete "610," and insert --605,-- therefor

In Column 12, Line 1, delete "620," and insert --610,-- therefor

In Column 12, Line 60, delete "630," and insert --615,-- therefor

In Column 13, Line 7, delete "640," and insert --620,-- therefor

In Column 13, Line 63, before "in", insert --than--

In the Claims

In Column 15, Line 65, in Claim 1, after " $\vec{x}_{new} = \vec{x}_{old} + \text{shift}(\vec{x}_{old}, \alpha)$, ", delete a linebreak In Column 16, Line 1, in Claim 1, after " $\vec{y}_{new} = \vec{y}_{old} + \text{shift}(\vec{y}_{old}, \alpha)$, ", delete a linebreak In Column 16, Line 6, in Claim 1, delete " $\vec{y}_{new}$, " and insert -- $\vec{y}_{new}$ -- therefor In Column 16, Line 20, in Claim 4, after " $\text{shift}(\vec{x}_{old}, \alpha) = \alpha * \vec{z}_x * (\max(\vec{x}_{old}) - \min(\vec{x}_{old}))$, ", delete a linebreak Signed and Sealed this
First Day of March, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,003,909 B2

In Column 16, Lines 23-24, in Claim 4, delete "$\text{shift}(\vec{y}_{old},\alpha)=\alpha*\vec{z}_y*(\max(\vec{y}_{old})-\min(\vec{y}_{old}))$ wherein:" and insert --$\text{shift}(\vec{y}_{old},\alpha)=\alpha*\vec{z}_y*(\max(\vec{y}_{old})-\min(\vec{y}_{old}))$, wherein:-- therefor In Column 16, Line 43, in Claim 6, delete "images;" and insert --images,-- therefor In Column 16, Lines 62-63, in Claim 6, delete "$\vec{x}_{new}=\vec{x}_{old}+\text{shift}(\vec{x}_{old},\alpha)$ and" and insert --$\vec{x}_{new}=\vec{x}_{old}+\text{shift}(\vec{x}_{old},\alpha)$, and-- therefor In Column 16, Lines 65-66, in Claim 6, delete "$\vec{y}_{new}=\vec{y}_{old}+\text{shift}(\vec{y}_{old},\alpha)$ wherein:" and insert --$\vec{y}_{new}=\vec{y}_{old}+\text{shift}(\vec{y}_{old},\alpha)$, wherein:-- therefor In Column 17, Line 19, in Claim 9, after "$\text{shift}(\vec{x}_{old},\alpha)=\alpha*\vec{z}_x*(\max(\vec{x}_{old})-\min(\vec{x}_{old}))$,", delete a linebreak In Column 17, Line 22, in Claim 9, after "$\text{shift}(\vec{y}_{old},\alpha)=\alpha*\vec{z}_y*(\max(\vec{y}_{old})-\min(\vec{y}_{old}))$,", delete a linebreak In Column 18, Line 12, in Claim 11, after "$\vec{x}_{new}=\vec{x}_{old}+\text{shift}(\vec{x}_{old},\alpha)$,", delete a linebreak In Column 18, Lines 15-16, in Claim 11, delete "$\vec{y}_{new}=\vec{y}_{old}+\text{shift}(\vec{y}_{old},\alpha)$ wherein:" and insert --$\vec{y}_{new}=\vec{y}_{old}+\text{shift}(\vec{y}_{old},\alpha)$, wherein:-- therefor In Column 18, Line 34, in Claim 14, after "$\text{shift}(\vec{x}_{old},\alpha)=\alpha*\vec{z}_x*(\max(\vec{x}_{old})-\min(\vec{x}_{old}))$,", delete a linebreak In Column 18, Line 37, in Claim 14, after "$\text{shift}(\vec{y}_{old},\alpha)=\alpha*\vec{z}_y*(\max(\vec{y}_{old})-\min(\vec{y}_{old}))$,", delete a linebreak